April 8, 1930. R. T. GRIFFITHS 1,753,702
ARTICLE OF SHOE MANUFACTURE AND METHOD OF MAKING THE SAME
Filed Sept. 12, 1928

Inventor:
Richard T. Griffiths,
by Spear, Middleton, Donaldson & Hall
Attys.

Patented Apr. 8, 1930

1,753,702

UNITED STATES PATENT OFFICE

RICHARD T. GRIFFITHS, OF AKRON, OHIO, ASSIGNOR TO THE MILLER RUBBER COMPANY, OF AKRON, OHIO, A CORPORATION OF OHIO

ARTICLE OF SHOE MANUFACTURE AND METHOD OF MAKING THE SAME

Application filed September 12, 1928. Serial No. 305,440.

This invention relates to improvements in the manufacture of shoes and more particularly it relates to improvements in the manufacture of shoes which are designed to be subjected to moisture, such as bathing shoes and slippers.

An object of the invention is to provide a combined heel, sole, and counter molded as a unitary article.

A further object is to mold such a one-piece article from a rubber compound, preferably a compound of the nature of hard rubber.

Another object is to provide a method of molding as much as possible of the unitary article, comprizing the combined heel, sole, and counter, in normal desired shape, those parts which it is difficult to mold in desired shape being molded as nearly to normal shape as possible, and being subsequently slitted and bent to form the article in normal desired shape.

Other objects will appear hereinafter.

The drawings illustrate one embodiment of my invention, and in which.

Figure 1:
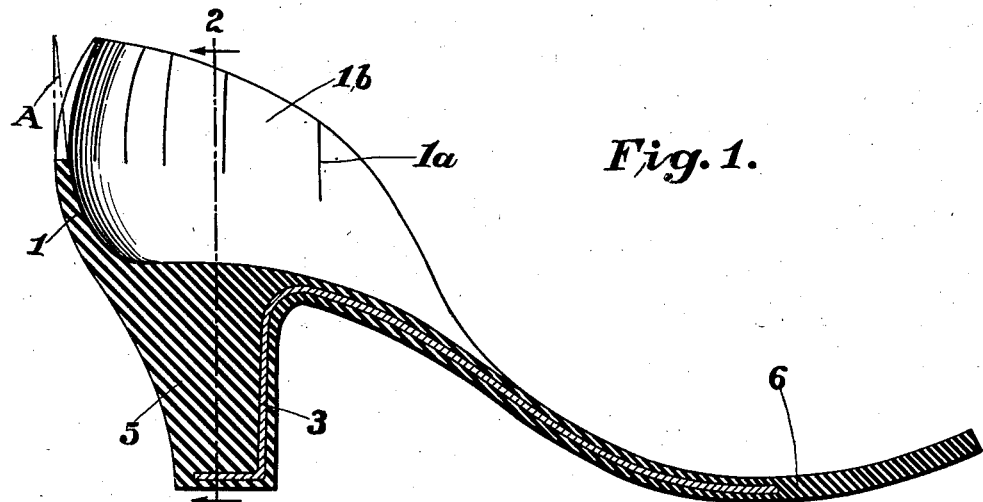
Figure 1 is a vertical longitudinal cross section through the unitary article comprising the combined heel, sole, and counter, which it is designed shall be molded integrally from rubber compound.

In the drawings, the counter is indicated by the numeral 1, the heel by the numeral 5, and the sole by the numeral 6, comprising together the unitary integrally molded article. According to the invention, the upper part of the counter 1 is molded in the position shown in dotted lines.

It is the usual practice that the mold parts operate in a vertical plane and it will be apparent that due to the back draft or curvature of the counter portion, it would ordinarily be necessary to make the mold in more than two parts in order to permit withdrawal of the mold parts from each other and withdrawal of the article from the mold.

Figure 2:
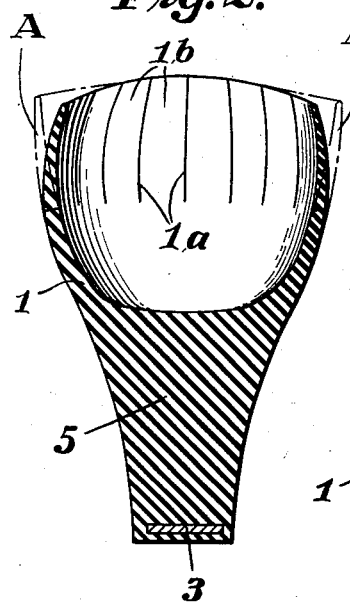
Fig. 2 is a section on line 2—2 of Fig. 1 and illustrates the heel looking toward the back thereof.
Figure 3:
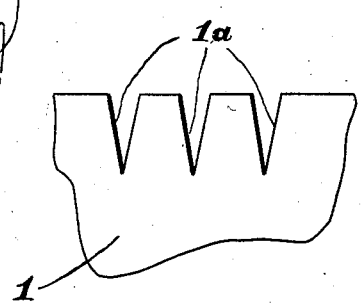
Fig. 3 is a detail view of a portion of the molded counter 1 with the slit 1ª cut therein.
Figure 4:
Fig. 4 is a detail view of a portion of the counter 1 bent to normal desired shape and provided with binding means.

To obviate this, the invention contemplates molding the upper part of the counter in the position shown in dotted lines at A in Figs. 1 and 2.

The invention contemplates that after the article has been molded and vulcanized, a number of notches 1ª are cut in the upper edge of the counter, having such angularity that after cutting, the portions 1ᵇ of the counter between the notches or cuts 1ª may be bent or curved inwardly to the position shown in full lines in Figs. 1 and 2, whereupon the sides of the notches, cuts or slits 1ª will come into contact.

The parts 1ᵇ having been curved or bent to their final desired position, a binding strip 2 preferably of rubber friction fabric is applied to hold the parts 1ᵇ in proper relation.

Preferably a steel spring 3 is inserted in the mold to reinforce the sole and heel as shown in Fig. 1. This spring member acts as a spring stiffener for the major portion of the shoe.

While the article may be molded of rubber compounds other than hard rubber, it is preferably molded of a hard rubber compound, and where such is the case, the bending of the article may be accomplished by immersing the molded and vulcanized article in warm water or otherwise heating it sufficiently to allow the bending to be accomplished.

Figure 5:
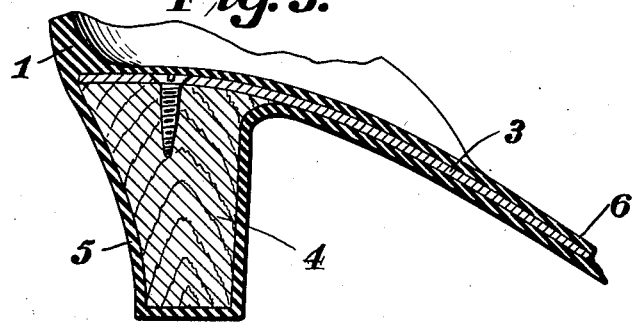
Fig. 5 is a view of a modified form of the invention.

Referring to the modification shown in Fig. 5, where the article is desired to be used in the manufacture of bathing shoes, it may be lightened by inserting a wood insert 4 in the heel portion before molding.

It is not desired to limit the invention to the exact structure shown, as it will be apparent that other modifications may be made without departing from the scope of the invention comprising the unitary molding of a combined heel, sole, and counter as an integral one-piece article.

I claim:

1. As an article of shoe manufacture, a one-piece body comprising heel, sole, and counter portions, said counter being provided with substantially vertically disposed cuts in its upper portion, and a binding strip along the upper edge of the counter.

2. The hereindescribed method of shoe manufacture comprising molding an integral body of rubber compound comprising heel, sole, and counter portions, cutting notches at spaced points in the upper edge of the counter portion, bending and curving the upper portion of the counter to bring the edges of the notches together and to attain the desired shape of the counter, and applying a binding strip to the upper edge of the counter.

3. The hereindescribed method of shoe manufacture comprising molding and vulcanizing an integral body of hard rubber compound comprising heel, sole, and counter portions, cutting notches at spaced points in the upper edge of the counter portion, applying heat to said counter portion to render the same pliable, bending and curving the upper portion of the counter to bring the edges of the notches together and to attain the desired shape of the counter, and applying a binding strip to the upper edge of the counter.

4. In a method according to claim 3, inserting a spring stiffener in the mold to reinforce the sole and heel portions of the molded integral body.

5. In an article of manufacture according to claim 1, said cuts being disposed in vertical planes and curving in said planes.

6. As an article of shoe manufacture an integral molded one-piece body comprising molded heel and sole, and molded upstanding counter portions, said molded upstanding counter portions including a plurality of upwardly and inwardly curving strips integrally joining at their lower ends to the lower part of the counter portion, and with their longitudinal side edges meeting to form an upwardly and inwardly curving upper counter portion.

7. An article of manufacture according to claim 6 in which said curving strips join the lower part of the counter portion on a horizontal line substantially central of the counter portion.

8. In an article of manufacture according to claim 6, a binding strip along the upper edge of the counter.

In testimony whereof, I affix my signature.

RICHARD T. GRIFFITHS.